United States Patent
Branigan et al.

(10) Patent No.: US 10,982,122 B2
(45) Date of Patent: Apr. 20, 2021

(54) HEAT CONFORMABLE CURABLE ADHESIVE FILMS

(71) Applicant: 3M INNOVATIVE PROPERTIES COMPANY, St. Paul, MN (US)

(72) Inventors: Margot A. Branigan, Roseville, MN (US); Thomas P. Klun, Lakeland, MN (US); Kevin R. Schaffer, Woodbury, MN (US); Audrey A. Sherman, Woodbury, MN (US); Christopher J. Campbell, Burnsville, MN (US); Lan H. Liu, Rosemount, MN (US); Wayne S. Mahoney, St. Paul, MN (US); Michael C. Palazzotto, Woodbury, MN (US); Robert R. Kieschke, Woodbury, MN (US)

(73) Assignee: 3M INNOVATIVE PROPERTIES COMPANY, St. Paul, MN (US)

(*) Notice: Subject to any disclaimer, the term of this patent is extended or adjusted under 35 U.S.C. 154(b) by 82 days.

(21) Appl. No.: 15/507,556

(22) PCT Filed: Sep. 1, 2015

(86) PCT No.: PCT/US2015/047883
§ 371 (c)(1),
(2) Date: Feb. 28, 2017

(87) PCT Pub. No.: WO2016/036701
PCT Pub. Date: Mar. 10, 2016

(65) Prior Publication Data
US 2017/0247589 A1 Aug. 31, 2017

Related U.S. Application Data

(60) Provisional application No. 62/046,324, filed on Sep. 5, 2014.

(51) Int. Cl.
| | |
|---|---|
| *C09J 175/16* | (2006.01) |
| *C08F 220/06* | (2006.01) |
| *C08F 290/06* | (2006.01) |
| *C08G 18/75* | (2006.01) |
| *C08J 5/18* | (2006.01) |
| *C09J 167/07* | (2006.01) |
| *C08G 18/81* | (2006.01) |
| *C08G 18/42* | (2006.01) |
| *C08F 299/02* | (2006.01) |
| *C09J 7/10* | (2018.01) |
| *B32B 27/36* | (2006.01) |
| *B32B 37/06* | (2006.01) |

(Continued)

(52) U.S. Cl.
CPC ............ *C09J 175/16* (2013.01); *B32B 27/36* (2013.01); *B32B 37/06* (2013.01); *C08F 290/061* (2013.01); *C08F 290/067* (2013.01); *C08F 299/028* (2013.01); *C08G 18/42* (2013.01); *C08G 18/4277* (2013.01); *C08G 18/755* (2013.01); *C08G 18/8116* (2013.01); *C08J 5/18* (2013.01); *C09J 5/06* (2013.01); *C09J 7/10* (2018.01); *C09J 133/10* (2013.01); *C09J 167/07* (2013.01); *B32B 2307/542* (2013.01); *C08J 2367/00* (2013.01); *C08J 2367/07* (2013.01); *C08J 2375/16* (2013.01); *C09J 2433/00* (2013.01); *C09J 2467/00* (2013.01); *C09J 2475/00* (2013.01)

(58) Field of Classification Search
CPC .... C08G 18/4277; C08G 18/42; C09J 175/16; C09J 7/10; C09J 5/18; C09J 5/06; C09J 133/10; C09J 167/07; C08F 290/067
See application file for complete search history.

(56) References Cited

U.S. PATENT DOCUMENTS

| | | |
|---|---|---|
| 3,644,267 A | 2/1972 | Jackson, Jr. |
| 3,708,296 A | 1/1973 | Schlesinger |
| | (Continued) | |

FOREIGN PATENT DOCUMENTS

| | | |
|---|---|---|
| EP | 0514147 | 11/1992 |
| JP | 08-167172 | 6/1996 |
| | (Continued) | |

OTHER PUBLICATIONS

Crivello, "Epoxidized Triglycerides as Renewable Monomers in Photoinitiated Cationic Polymerization," Chemistry of Materials, May 1992, vol. 4, No. 3, pp. 692-699.

(Continued)

*Primary Examiner* — Michael L Leonard
(74) *Attorney, Agent, or Firm* — Jeffrey M. Olofson

(57) ABSTRACT

Optically clear curable adhesive films that are heat conformable prior to setting include a reactive composition. The curable films are flexible and free-standing, and have a complex viscosity of greater than 100,000 poise (10,000 Pascal seconds) at 25° C. and less than 100 poise (10 Pascal seconds) at 85° C., prior to setting. The set film has an adhesive shear strength of greater than 100 Newtons per square centimeter (N/cm$^2$) to a glass substrate when measured according to the Shear Adhesion Test Method. The reactive composition includes an ethylenically unsaturated polyester-containing oligomeric composition that is the reaction product of a saturated, amorphous co-polyester polyol and a compound with a terminal polyol-reactive group and a terminal ethylenically unsaturated group, a (meth)acrylate functional material, and at least one initiator.

18 Claims, No Drawings

(51) Int. Cl.
*C09J 5/06* (2006.01)
*C09J 133/10* (2006.01)

(56) References Cited

U.S. PATENT DOCUMENTS

| | | | |
|---|---|---|---|
| 4,069,055 A | 1/1978 | Crivello | |
| 4,216,288 A | 8/1980 | Crivello | |
| 4,250,311 A | 2/1981 | Crivello | |
| 5,084,586 A | 1/1992 | Farooq | |
| 5,124,417 A | 6/1992 | Farooq | |
| 5,223,465 A | 6/1993 | Ueki | |
| RE34,605 E | 5/1994 | Schrenk | |
| 5,360,659 A | 11/1994 | Arends | |
| 5,554,664 A | 9/1996 | Lamanna | |
| 5,579,162 A | 11/1996 | Bjornard | |
| 5,882,774 A | 3/1999 | Jonza | |
| 5,900,473 A * | 5/1999 | Acevedo | C08G 18/4202 528/271 |
| 6,049,419 A | 4/2000 | Wheatley | |
| 7,585,570 B2 | 9/2009 | Takeko | |
| 7,816,477 B2 | 10/2010 | Suwa | |
| 8,124,169 B2 | 2/2012 | Ylitalo | |
| 8,742,022 B2 | 6/2014 | Pokorny | |
| 9,296,904 B2 | 3/2016 | Pokorny | |
| 2009/0029100 A1 | 1/2009 | Wigdorski | |
| 2010/0247940 A1 | 9/2010 | Takahashi | |
| 2011/0206869 A1 | 8/2011 | Nemoto | |
| 2012/0172484 A1 | 7/2012 | Kim | |
| 2012/0325402 A1 | 12/2012 | Suwa | |
| 2013/0323521 A1 | 12/2013 | Xia | |
| 2014/0302313 A1 | 10/2014 | Suwa | |
| 2015/0024218 A1* | 1/2015 | Koga | C08G 18/672 428/423.1 |

FOREIGN PATENT DOCUMENTS

| | | | |
|---|---|---|---|
| JP | 2001-123136 | 5/2001 | |
| WO | WO-2010/008174 * | 1/2010 | C09D 175/06 |
| WO | WO 2010-38366 | 4/2010 | |
| WO | WO 2011-112447 | 9/2011 | |
| WO | WO 2012-024354 | 2/2012 | |
| WO | WO 2012-112856 | 8/2012 | |
| WO | WO 2012-121122 | 9/2012 | |
| WO | WO 2013-027657 | 2/2013 | |
| WO | WO 2013-067947 | 5/2013 | |
| WO | WO 2013-118919 | 8/2013 | |
| WO | WO 2013-122144 | 8/2013 | |
| WO | WO 2013-181133 | 12/2013 | |

OTHER PUBLICATIONS

Encyclopedia of Polymer Science and Engineering, $2^{nd}$ Edition, vol. 6, John Wiley and Sons, New York, 1986, pp. 322-382.

Kirk-Othmer Encyclopedia of Chemical Technology, $4^{th}$ Edition, Supplement Volume, John Wiley and Sons, New York, 1998, pp. 253-255.

International Search Report for PCT International Application No. PCT/US2015/047883, dated Jan. 8, 2016, 4 pages.

* cited by examiner

HEAT CONFORMABLE CURABLE ADHESIVE FILMS

FIELD OF THE DISCLOSURE

This disclosure relates to adhesive articles, including adhesive films, and methods for preparing and using these adhesive articles. The adhesive films are heat conformable.

BACKGROUND

Adhesives have been used for a variety of marking, holding, protecting, sealing and masking purposes. One type of adhesive, a pressure sensitive adhesive, is particularly preferred for many applications. A closely related type of adhesive are heat activated adhesives. Unlike pressure sensitive adhesives, heat activated adhesives are not tacky at room temperature but become tacky upon heating. Another class of adhesives are called curable or set adhesives. These materials adhere to substrates in the uncured state, but upon curing or setting form hardened permanent adhesive bonds.

Pressure sensitive adhesives are well known to one of ordinary skill in the art to possess certain properties at room temperature including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as pressure sensitive adhesives are polymers designed and formulated to exhibit the requisite viscoelastic properties resulting in a desired balance of tack, peel adhesion, and shear strength. The most commonly used polymers for preparation of pressure sensitive adhesives are natural rubber, synthetic rubbers (e.g., styrene/butadiene copolymers (SBR) and styrene/isoprene/styrene (SIS) block copolymers), various (meth)acrylate (e.g., acrylate and methacrylate) copolymers and silicones. Each of these classes of materials has advantages and disadvantages.

Heat activated adhesives are non-tacky at room temperature but become tacky and capable of bonding to a substrate at elevated temperatures. These adhesives usually have a $T_g$ (glass transition temperature) or melting point ($T_m$) above room temperature. When the temperature is elevated above the $T_g$ or $T_m$, the storage modulus usually decreases and the adhesive becomes tacky.

Among the growing uses for adhesive materials is their use in optical devices. In some applications the adhesives are used to bond optical films or substrates and thus are optically clear so as to not interfere with light passing through the device. Among the adhesives that have been developed for these uses are curable adhesives that can be applied as a liquid and then cured to form an optical laminate, or pressure sensitive or heat activated adhesives that are applied to an optical film or substrate and laminated to optical substrates to form optical laminates.

A number of patent publications describe curable optically clear adhesives that can be applied to optical substrates to form optical laminates. In Japanese Publication No. JP 08-167172, a photosetting resin for bonding optical disks is described that includes 20-80 wt % of urethane (meth)acrylate and 0-50 wt % of monomer other than (meth)acrylate monomer, and a photopolymerization initiator. In PCT Publication No. WO 2013/067947, a dual-curable adhesive composition comprising: (a) an epoxy resin; at least one of (b) a (meth)acrylate monomer or (c) a (meth)acrylate oligomer; (d) an epoxy thermal polymerization catalyst; and (e) a photopolymerization initiator that is a mixture of a cationic photopolymerization initiator and a free radical polymerization initiator. PCT Publication Nos. WO 3012/121122, WO 2013/027657, and WO 2013/118919 describe adhesive sheets prepared from (meth)acrylate monomers in combination with additional co-reactive and non-reactive materials.

US Patent Publication No. 2012/0325402 (Suwa et al.) describes a heat activated optically clear adhesive for bonding display assemblies. The display assemblies include two substrates, at least one of which has three dimensional surface topography or is distortion sensitive. Laminates of two substrates and the heat activated optically clear adhesive are heated to a temperature of from 40-120° C. to activate the heat activated adhesive and cause it to flow.

US Patent Publication No. 2011/0206869 (Nemoto et al.) describes a photocurable adhesive composition which can bond rugged adhesives without damage to the adherends and without forming a gap therebetween. The photocurable adhesive composition comprises: (A) 100 parts by mass of a urethane (meth)acrylate oligomer with a molecular weight of 20,000-100,000; (B) 5-70 parts by mass of a phenoxy resin; and (C) 0.1-10 parts by mass of a photopolymerization initiator.

SUMMARY

This disclosure relates to adhesive articles, including adhesive films, and methods for preparing and using these adhesive articles. The adhesive films are flexible, optically clear curable films having a number of desirable features including being heat conformable prior to setting.

In some embodiments the curable film comprises a reactive composition, wherein the curable film is a flexible, free-standing, optically clear, conformable film having a complex viscosity of greater than 100,000 poise (10,000 Pascal seconds) at 25° C. and less than 100 poise (10 Pascal seconds) at 85° C., prior to setting, and wherein the set film has an adhesive shear strength of greater than 100 Newtons per square centimeter (N/cm$^2$) to a glass substrate when measured according to the Shear Adhesion Test Method. In some embodiments of the curable films, the reactive composition comprises an ethylenically unsaturated polyester-containing oligomeric composition that is the reaction product of a saturated, amorphous co-polyester polyol and a compound with a terminal polyol-reactive group and a terminal ethylenically unsaturated group, a (meth)acrylate functional material, and at least one initiator.

Also disclosed are articles. In some embodiments the article comprises a first substrate with a first major surface and a second major surface, and a curable film contacting the second major surface of the first substrate, the curable film comprising a flexible, free-standing, optically clear, conformable film having a complex viscosity of greater than 100,000 poise (10,000 Pascal seconds) at 25° C. and less than 100 poise (10 Pascal seconds) at 85° C., prior to setting, and wherein the set film has an adhesive shear strength of greater than 100 Newtons per square centimeter (N/cm$^2$) to a glass substrate when measured according to the Shear Adhesion Test Method. In some embodiments of the articles, the reactive composition comprises an ethylenically unsaturated polyester-containing oligomeric composition that is the reaction product of a saturated, amorphous co-polyester polyol and a compound with a terminal polyol-reactive group and a terminal ethylenically unsaturated group, a (meth)acrylate functional material, and at least one initiator.

Also disclosed are methods of using a curable film. In some embodiments the method of using a curable film comprises providing a curable film, the curable film comprising a reactive composition comprising a flexible, free-standing, optically clear, conformable film having a complex viscosity of greater than 100,000 poise (10,000 Pascal seconds) at 25° C. and less than 100 poise (10 Pascal seconds) at 85° C., prior to setting and wherein the set film has an adhesive shear strength of greater than 100 Newtons per square centimeter (N/cm$^2$) to a glass substrate when measured according to the Shear Adhesion Test Method, providing a first substrate with a first major surface and a second major surface, contacting the curable film to the second major surface of the first substrate, heating the curable film on the second major surface of the first substrate to a temperature of less than 85° C. to permit conforming of the film to the first substrate, and curing the curable film. In some embodiments, the reactive composition comprises an ethylenically unsaturated polyester-containing oligomeric composition that is the reaction product of a saturated, amorphous co-polyester polyol and a compound with a terminal polyol-reactive group and a terminal ethylenically unsaturated group, a (meth)acrylate functional material, and at least one initiator.

DETAILED DESCRIPTION

The use of adhesives in areas such as the medical, electronic, automotive, energy, and optical industries is increasing. The requirements of these industries place additional demands upon the adhesive beyond the traditional properties of tack, peel adhesion and shear holding power. New classes of materials are desirable to meet the increasingly demanding performance requirements for adhesives. Among the performance requirements for new classes of adhesives are optical properties such as being optically transparent or optically clear.

In particular, the electronics industry has particularly stringent performance requirements that require the development of new adhesive materials and articles. For example, the display screens of electronic devices contain a variety of optical films that are held in place by layers of adhesive. Among the requirements of adhesive layers for such devices are optical clarity, durability over time (the ability to not yellow, crack, peel, delaminate, or otherwise degrade over the lifetime of the device), ease of handling, ease of lamination (the ability to be laminated to a rigid or nonrigid substrate without having air bubbles or other defects in the bondline), and the like, without losing the fundamental adhesive properties such as peel adhesion and shear strength (sometimes called shear holding power).

In addition to all of these demands upon the adhesive layer, many electronic devices additionally can contain surface structures. The adhesive layer not only must form an adhesive bond to these structures, but also must conform to the structures to at least some extent, to prevent the generation of air gaps around the structures that can adversely affect the passage of light in the display surface. Air gaps are a concern because the refractive index of air is sufficiently different from the refractive index of the layers of optical materials of the display (such as the substrate, film layers, and adhesive layers) that light passing through the optical layer/air interface is refracted, causing scattering of light. This scattering can cause light designed to be transmitted to be lost, decreasing the brightness and efficiency of the display, or the scattering can cause light to be displayed in regions where the light is not designed to be transmitted, decreasing the contrast of the display.

Examples of such devices are touch panels and a display panels. Bonding a touch panel or display panel (such as an LCD panel) to a three-dimensional (3-D) cover glass by means of an optically clear adhesive can be challenging. Indeed, newer designs use cover glasses having a thick (approaching 50 micrometers) ink step around the perimeter or frame of the cover glass, generating a substrate that is no longer flat but has a third dimension to it (i.e. the optically clear adhesive has to conform to significant differences in the z-dimension of the cover lens substrate). The region encompassed by the ink step is often referred to as a gap. Some pressure sensitive or heat activated adhesives, including optically clear adhesives, may not be compliant enough to conform over the ink area and thus do not completely fill the gap or completely wet the surface of the corresponding viewing area of the display.

In addition to the large ink step, other 3-D features that may require good adhesive wetting of any of the display components include things like the presence of a flex connector, slight curvature of the components, thicker ITO patterns, presence of raised integrated circuits on a touch panel and the like.

Typical optically clear adhesives, such as pressure sensitive and heat activated adhesives, are covalently cross-linked, minimizing their ability to flow. Thus, they may be substantially incompressible, forcing the thinner glass panels to deform during and after bonding to the other display assembly components. Therefore, often curable liquid adhesives have been used in such applications. Liquid optically clear adhesives can flow laterally very well and can be considered very compliant in their uncured state. Thus curable liquid optically clear adhesives can successfully fill the gap formed by the ink step and other 3-D features, but there are a number of disadvantages of using a curable liquid optically clear adhesive. For example, curable liquid optically clear adhesives may require costly dispensing equipment. Also, curable liquid optically clear adhesives may require careful management of the gap setting between the display assembly components (i.e. between cover glass and touch (display) panel, touch panel and LCD, cover glass and AMOLED, etc.) and may require extra cleaning processes to control adhesive overflow. In addition, curing shrinkage can lead to local stresses and deformation of distortion sensitive components, again leading to optical distortions in the display.

Therefore, an optically clear adhesive that be handled and laminated as a free-standing film but is compliant enough to behave like a liquid adhesive and conform to 3D structures on a substrate surface would be desirable for a number of applications.

In this disclosure, a flexible, free-standing curable film is presented that can be applied and handled as a film but upon heating to relatively low temperature (at most 85° C.) the film softens and conforms to the structures on the surface and then cures to form an adhesive layer that has the desirable structural integrity and durability to withstand the use demands described above. In this way the desirable conformability of a liquid adhesive is provided by a convenient film adhesive.

Disclosed herein are curable free-standing optically clear films comprising a reactive composition, where the reactive composition comprises an ethylenically unsaturated polyester-containing oligomeric composition that is the reaction product of a saturated, amorphous co-polyester polyol and a compound with a terminal polyol-reactive group and a terminal ethylenically unsaturated group, a (meth)acrylate functional material, and at least one initiator. In some embodiments, the reactive composition may also comprise a reactive adhesion promotion compound comprising epoxy or (meth)acrylate functionality. Also disclosed are articles comprising at least one substrate and the curable free-standing optically clear films, and methods of preparing and using the curable free-standing optically clear films.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to "a layer" encompasses embodiments having one, two or more layers. As used in this specification and the appended claims, the term "or" is generally employed in its sense including "and/or" unless the content clearly dictates otherwise.

The term "adhesive" as used herein refers to polymeric compositions useful to adhere together two adherends. Examples of adhesives are heat activated adhesives, pressure sensitive adhesives, and curable adhesives.

Heat activated adhesives are non-tacky at room temperature but become tacky and capable of bonding to a substrate at elevated temperatures. These adhesives usually have a $T_g$ (glass transition temperature) or melting point ($T_m$) above room temperature. When the temperature is elevated above the $T_g$ or $T_m$, the storage modulus usually decreases and the adhesive becomes tacky.

Pressure sensitive adhesive compositions are well known to those of ordinary skill in the art to possess properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

Curable adhesives, also called "set" adhesives are ones that form adhesive bonds in an uncured state, and then are converted into a hardened or set state by a chemical reaction, often referred to as "curing". Unlike pressure sensitive and heat activated states which retain an "adhesive" or bondable state, once curing has occurred, the hardened curable adhesive cannot be reverted to a bondable state, and the adhesive bond formed is permanent.

The term "polyester-containing" as used herein refers to molecule or polymer in which at least some of the repeat units are polyester units. Polyester units are ones that are linked by ester linkages, ester linkages have the general structure $R^aO$—(CO)—$R^b$, where $R^a$ and $R^b$ are alkylene, arylene, or aralkylene groups and (CO) is a carbonyl group C=O.

The term "conformable" as used herein refers to a free-standing film which is sufficiently soft and flowable to be able to fill gaps by displacing air from a three dimensionally structured surface upon heating to less than 85° C. and finger pressure. Films that have this property can flow under vacuum lamination to surround a structure with at least one dimension of up to 100 micrometers.

The term "reactive oligomer" as used herein refers to a macromolecule which contains terminal free radically polymerizable groups and at least 2 segments which are linked. "Polyester-containing reactive oligomers" are macromolecules which contain terminal free radical polymerizable groups and at least 2 segments which are linked by ester linkages.

The terms "setting", "curing", and "reacting" are used interchangeably to describe the reaction or polymerization of reactive groups in a reactive composition to form a polymeric composition that is no longer reactive. The setting, curing, or reacting may or may not involve crosslinking.

The term "hydrocarbon group" as used herein refers to any monovalent group that contains primarily or exclusively carbon and hydrogen atoms. Alkyl and aryl groups are examples of hydrocarbon groups.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

The term "aryl" refers to a monovalent group that is aromatic and carbocyclic. The aryl can have one to five rings that are connected to or fused to the aromatic ring. The other ring structures can be aromatic, non-aromatic, or combinations thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

The term "alkylene" refers to a divalent group that is a radical of an alkane. The alkylene can be straight-chained, branched, cyclic, or combinations thereof. The alkylene often has 1 to 20 carbon atoms. In some embodiments, the alkylene contains 1 to 18, 1 to 12, 1 to 10, 1 to 8, 1 to 6, or 1 to 4 carbon atoms. The radical centers of the alkylene can be on the same carbon atom (i.e., an alkylidene) or on different carbon atoms.

The term "heteroalkylene" refers to a divalent group that includes at least two alkylene groups connected by a thio, oxy, or —NR— where R is alkyl. The heteroalkylene can be linear, branched, cyclic, substituted with alkyl groups, or combinations thereof. Some heteroalkylenes are poloxyyalkylenes where the heteroatom is oxygen such as for example,

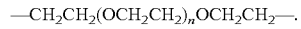

—CH$_2$CH$_2$(OCH$_2$CH$_2$)$_n$OCH$_2$CH$_2$—.

The term "arylene" refers to a divalent group that is carbocyclic and aromatic. The group has one to five rings that are connected, fused, or combinations thereof. The other rings can be aromatic, non-aromatic, or combinations thereof. In some embodiments, the arylene group has up to 5 rings, up to 4 rings, up to 3 rings, up to 2 rings, or one aromatic ring. For example, the arylene group can be phenylene.

The term "heteroarylene" refers to a divalent group that is carbocyclic and aromatic and contains heteroatoms such as sulfur, oxygen, nitrogen or halogens such as fluorine, chlorine, bromine or iodine.

The term "aralkylene" refers to a divalent group of formula —$R^a$—$Ar^a$— where $R^a$ is an alkylene and $Ar^a$ is an arylene (i.e., an alkylene is bonded to an arylene).

The term "(meth)acrylate" refers to monomeric acrylic or methacrylic esters of alcohols. Acrylate and methacrylate monomers or oligomers are referred to collectively herein as "(meth)acrylates". Materials referred to as "(meth)acrylate functional" are materials that contain one or more (meth) acrylate groups.

The terms "free radically polymerizable" and "ethylenically unsaturated" are used interchangeably and refer to a reactive group which contains a carbon-carbon double bond which is able to be polymerized via a free radical polymerization mechanism.

Unless otherwise indicated, "optically transparent" refers to an article, film or adhesive that has a high light transmittance over at least a portion of the visible light spectrum (about 400 to about 700 nm). The term "transparent film" refers to a film having a thickness and when the film is disposed on a substrate, an image (disposed on or adjacent to the substrate) is visible through the thickness of the transparent film. In many embodiments, a transparent film allows the image to be seen through the thickness of the film without substantial loss of image clarity. In some embodiments, the transparent film has a matte or glossy finish.

Unless otherwise indicated, "optically clear" refers to an adhesive or article that has a high light transmittance over at least a portion of the visible light spectrum (about 400 to about 700 nm), and that exhibits low haze, such as a haze of less than 1% at a thickness of 50 micrometers or even 0.5% at a thickness of 50 micrometers. Optically clear adhesives or articles are color neutral on the CIE Lab scale, with the a or b values being less than 0.5.

The term "free-standing" when used to describe a film is the conventionally understood meaning of the term, meaning that the film is capable of being handled without being carried by another film or layer. A free-standing film can be laminated to another film or layer and used in this way, but it does not require an additional film or layer for structural support.

The term "flexible" when used to describe a film is the conventionally understood meaning of the term, meaning that the film is non-rigid and capable of being bent without shattering, breaking or being damaged. In particular, films are considered to be flexible if they are capable of being bent to angle of 45° or more without causing damage to the film. More typically, flexible films are capable of being bent to angle of 90° or more without causing damage to the film.

Described herein are curable films comprising a reactive composition wherein the curable film is a flexible, free-standing optically clear film conformable to three dimensional features on a substrate upon heating to a temperature of 85° C. or less. This conformability can be described by the complex viscosity of the film. The films of this disclosure have a complex viscosity of greater than 100,000 poise (10,000 Pascal seconds) at 25° C. and less than 100 poise (10 Pascal seconds) at 85° C., prior to setting (reaction of reactive groups in the reactive composition to form a polymeric composition that is no longer reactive). Complex viscosity is defined as a frequency-dependent viscosity function determined during forced harmonic oscillation of shear stress. Complex viscosity is measured by Dynamic Mechanical Analysis (DMA) using a rheometer.

Upon setting, the adhesive bond formed between the film and a glass substrate has an adhesive strength of greater than 100 Newtons per square centimeter ($N/cm^2$) when measured according to the shear adhesion test method described in the Examples section, which is a modification of the ASTM test method ASTM D1002-10 with glass substrates in place of metal ones. The adhesive strength of the set adhesive film to glass substrates is a performance characteristic of the adhesive film. This property is similar to other performance properties characteristic of the adhesive film, and this characteristic does not mean that the adhesive films of this disclosure only bond to glass, rather glass is used as a standard test substrate, and the shear adhesion to glass is thus a measurable property of the reactive adhesive film once it is set, and is not the description of an article comprising glass substrates and the set reactive adhesive film. In a similar way, when peel adhesion parameters are reported in the art, the articles tested are of an adhesive layer on a backing layer adhered to a substrate (typically stainless steel or glass). The adhesive and backing are peeled away at a give angle (typically 90° or 180°) and the force required is measured. This peel force or peel adhesion is a physical property of the adhesive layer, it is not a description of a property of the substrate/adhesive/backing article. The article is simply used as a method for determining the property of the adhesive.

A wide range of thicknesses are suitable for the curable films of this disclosure. A number of factors influence the desired thickness for the curable film. Since, as will be described below, the curable film is often photocured, it is generally desirable that the curable film not be greater than 152 micrometers thick (6 mils) as films thicker than this can be difficult to photocure. On the other hand, since the curable film is designed to conform to surface structures on a substrate to which it is in contact, it is generally desirable that the curable film be thicker than 25 micrometers (1 mil) so that in conforming to the surface structures the curable film does not develop surface irregularities. Another factor controlling the thickness of the curable film is the size of the surface structures on the substrate to which it is to be contacted. Typically, the curable film is the same height or thicker than the height of the surface structures to which it is desirable for the film to conform. Therefore, the curable film is typically from 25-152 micrometers, in some embodiments 25-125 micrometers, 50-100 micrometers, or even 50-75 micrometers.

The curable film comprises a reactive composition. By reactive composition it is meant that the composition is free-radically polymerizable. Additionally, the reactive composition may also contain reactive compounds that react by other mechanisms such as cationic polymerization. The components of the reactive composition provide the desirable conformability and optical features to the curable adhesive film, as well as the adhesive performance properties. The reactive composition may comprise only reactive components, or the reactive composition may also comprise optional non-reactive components. The components are selected to give a film that is flexible yet free-standing, is optically clear and also is conformable upon heating to a relatively low temperature. Upon curing, the components give a strong and durable adhesive bond. Balancing all of these parameters, some of which are conflicting with each other, is clearly not a simple process.

Typically, the reactive composition comprises at least two reactive components: an ethylenically unsaturated polyester-containing oligomeric composition; and a (meth)acrylate functional material, and at least one initiator. In some embodiments, the reactive composition may also comprise other reactive components such as reactive adhesion promoters and/or crosslinkers. Each of these components is described in greater detail below.

The reactive composition comprises an ethylenically unsaturated polyester-containing oligomeric composition. This ethylenically unsaturated polyester-containing oligomeric composition is the reaction product of a saturated, amorphous co-polyester polyol and a compound with a terminal polyol-reactive group and a terminal ethylenically unsaturated group. A variety of saturated, amorphous co-polyester polyols are suitable for preparing the ethylenically unsaturated polyester-containing oligomeric composition. Generally, saturated, amorphous co-polyester polyols with a number average molecular weight of from about 1,500 g/mole to about 5,000 g/mole are suitable. Examples of commercially available saturated, amorphous co-polyester polyols include those available from Evonik Industries, Parsippany, N.J. as "DYNACOLL 7110" and "DYNACOLL 7111", and the caprolactone polyol "CAPA 2100" commercially available from Perstorp, Toledo, Ohio.

The saturated, amorphous co-polyester polyols can be reacted with a variety of compounds which contain a terminal polyol-reactive group and a terminal ethylenically unsaturated group. Compounds which contain a terminal polyol-reactive group and a terminal ethylenically unsaturated group can be described by the general structure X—Z. The X group of the X—Z compound is a polyol-reactive group and the Z group contains an ethylenically unsaturated group. A variety of X groups are useful, including carboxylic acids, isocyantes, epoxies, azlactones and anhydrides. The Z group contains an ethylenically unsaturated group and is linked to the X group. Suitable terminal ethylenically unsaturated groups include (meth)acrylate groups, vinyl groups, and allyl groups. The link between the X and Z groups may be a single bond or it may be a linking group. The linking group may be an alkylene group, a heteroalkylene group, an arylene group, a heteroarylene group, an aralkylene group, or a combination thereof. Examples of X—Z compounds include isocyanato (meth)acrylates, alkenyl azlactones such as vinyl dimethyl azlactone and isopropenyl dimethyl azlactone, m-isopropenyl-α,α-dimethyl benzyl isocyanate, and acryloyl ethyl carbonic anhydride. In some embodiments the X—Z compound is isocyanatoethyl methacrylate or vinyl dimethyl azlactone. Often the reaction of polyols with these polyol-reactive compounds is facilitated through the use of a catalyst. Examples of suitable catalysts include tin catalysts such as di-butyl tin dilaurate (DBTDL).

Typically the saturated, amorphous co-polyester polyols have an average functionality of two, meaning that they are diols. Generally it is desirable to have hydroxyl groups present in the oligomer formed by the reaction mixture. Therefore it is desirable to control the stoichiometry of reaction mixture used to prepare ethylenically unsaturated polyester-containing oligomeric composition, such that on average only one of the hydroxyl groups on the polyol reacts with an X—Z compound. Thus the reaction mixture typically comprises a ratio of hydroxyl groups to hydroxyl reactive groups (X groups) of less than 1:1. In other words, if the ratio of the number of hydroxyl groups to the number of hydroxyl reactive groups were 1:1, all of the hydroxyl groups on the polyol would react. In many embodiments, the ratio of the number of hydroxyl groups to the number of hydroxyl reactive groups is 1:0.5. The idealized reaction is shown below in Reaction Scheme 1 below in which polyol (HO—B—OH) reacts with compound X—Z. The reaction of a hydroxyl group with the group X forms new linkage W. Thus, the product of this reaction mixture is an oligomeric compound with a hydroxyl group at one terminus and an ethylenically unsaturated group at the other terminus. In reality, the result of the reaction mixture presented in Reaction Scheme 1 generally is not the single compound shown in Reaction Scheme 1, but rather is a mixture, the mixture comprising unreacted polyol (HO—B—OH), an oligomeric compound with a hydroxyl group at one terminus and an ethylenically unsaturated group at the other terminus (HO—B—W—Z), and an oligomeric compound in which both termini have been substituted with an ethylenically unsaturated group (Z—W—B—W—Z).

HO—B—OH+X—Z→HO—B—W—Z      Reaction Scheme 1

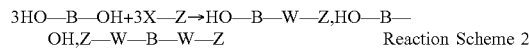

3HO—B—OH+3X—Z→HO—B—W—Z,HO—B—OH,Z—W—B—W—Z      Reaction Scheme 2

In addition to the relatively straightforward capping reaction described above, other more complex reaction schemes can be used to prepare the ethylenically unsaturated polyester-containing oligomeric composition. In these more complex reaction schemes, rather than an X—Z type of compound, the polyol can be reacted with a difunctional compound X—X. In this way, a compound of the type HO—B—W—X is formed, where the reaction of a hydroxyl group with the group X forms new linkage W. Additionally, if the proper conditions are used, a compound of the type X—W—B—W—X can also be prepared. These compounds can then be reacted with a Y—Z compound, where Y contains a terminal group reactive with X groups, and the Z group contains an ethylenically unsaturated group, as described above. The resulting ethylenically unsaturated compound has one or two terminal ethylenically unsaturated groups and can also have a terminal hydroxyl group. These compounds are very similar to those described above with the exception that they contain additional linkages and are of a higher molecular weight.

The reactive composition also comprises a (meth)acrylate functional material. A wide variety of (meth)acrylate functional materials are suitable. The (meth)acrylate material may be a monomer such as, for example hydroxypropyl acrylate, or it may be a (meth)acrylate functional oligomeric material. The (meth)acrylate functional material co-polymerizes with the ethylenically unsaturated polyester-containing oligomeric composition, and it is desirable that the (meth)acrylate functional material have sufficient compatibility with the ethylenically unsaturated polyester-containing oligomeric composition so as to not adversely affect the optical and mechanical properties of the curable film.

In some embodiments, the reactive composition comprises a (meth)acrylate functional oligomeric material comprising polyester linkages, urethane linkages or a combination thereof. In other words, the (meth)acrylate functional material can comprise an oligomeric material with polyester linkages and/or urethane linkages. While not wishing to be bound by theory, it is believed that the polyester groups on the (meth)acrylate functional oligomer helps to make this oligomer compatible with the ethylenically unsaturated polyester-containing oligomeric composition, and thus helps to provide a composition with optical clarity. Examples of suitable (meth)acrylate functional oligomeric material comprising polyester linkages may be prepared from a wide range of polyester polyols. The (meth)acrylate functional oligomeric material comprising polyester linkages can be prepared by capping the polyester polyols with an isocyanate (meth)acrylate as described above, or a more complex capping reactions can be used. In some embodiments, it may be desirable to react a polyester polyol with a polyisocyanate to form an isocyanate-functional polyester. This isocyanate-functional polyester can then be reacted with compound containing a terminal isocyanate-reactive group and a terminal (meth)acrylate group. Examples of compounds containing a terminal isocyanate-reactive group and a terminal (meth)acrylate group include hydroxyl-functional (meth) acrylates, such as hydroxyethyl acrylate (HEA). In this way the isocyanate-reactive group reacts with the isocyanate groups on the isocyanate-functional polyester to form a (meth)acrylate-functional oligomer comprising polyester linkages. In this instance, the (meth)acrylate-functional oligomer comprising polyester linkages will also comprise urethane linkages.

The reactive composition additionally comprises at least one initiator. The at least one initiator is a free radical initiator. In some embodiments, where epoxy-functional reactive compounds are present, as described below, a cationic initiator may also be present. Free radical initiators are ones that generate free radicals upon initiation, cationic initiators are ones that generate one or more molecules of a Brönsted or Lewis acid upon initiation. Typically the initiator or initiators comprise photoinitiators, meaning that the initiator is activated by light, typically ultraviolet (UV) light. Examples of suitable free radical photoinitiators include DAROCURE 4265, IRGACURE 651, IRGACURE 1173, IRGACURE 819, LUCIRIN TPO, LUCIRIN TPO-L, commercially available from BASF, Charlotte, N.C.

Examples of suitable cationic photoinitiators are those in which the incipient acid has a pKa value of ≤0. Cationic photoinitiators—also known as photoacid generators—are generally ionic salts, and are known and reference may be made to K. Dietliker, Chemistry and Technology of UV and EB Formulation for Coatings, Inks and Paints, vol. III, SITA Technology Ltd., London, 1991. Further reference may be made to Kirk-Othmer Encyclopedia of Chemical Technology, 4th Edition, Supplement Volume, John Wiley and Sons, New York, year, pp 253-255.

Cations useful as the cationic portion of the cationic photoinitiators include organic onium cations, for example those described in U.S. Pat. Nos. 4,250,311, 3,708,296, 4,069,055, 4,216,288, 5,084,586, 5,124,417, 5,554,664, including aliphatic or aromatic Group WA VIIA (CAS version) centered onium salts, generally I-, S-, P-, Se- N- and C-centered onium salts, such as those selected from, sulfoxonium, iodonium, sulfonium, selenonium, pyridinium, carbonium and phosphonium, and most typically I-, and S-centered onium salts, such as those selected from sulfoxonium, diaryliodonium, triarylsulfonium, diarylalkylsulfonium, dialkylarylsulfonium, and trialkylsulfonium wherein "aryl" and "alkyl" are as defined and having up to four independently selected substituents. The substituents on the aryl or alkyl moieties will generally have less than 30 carbon atoms and up to 10 heteroatoms selected from N, S, non-peroxidic O, P, As, Si, Sn, B, Ge, Te, Se. Examples include hydrocarbyl groups such as methyl, ethyl, butyl, dodecyl, tetracosanyl, benzyl, allyl, benzylidene, ethenyl and ethynyl; hydrocarbyloxy groups such as methoxy, butoxy and phenoxy; hydrocarbylmercapto groups such as methylmercapto and phenylmercapto; hydrocarbyloxycarbonyl groups such as methoxycarbonyl and phenoxycarbonyl; hydrocarbylcarbonyl groups such as formyl, acetyl and benzoyl; hydrocarbylcarbonyloxy groups such as acetoxy and cyclohexanecarbonyloxy; hydrocarbylcarbonamido groups such as acetamido and benzamido; azo; boryl; halo groups such as chloro, bromo, iodo and fluoro; hydroxy; oxo; diphenylarsino; diphenylstilbino; trimethylgermano; trimethylsiloxy; and aromatic groups such as cyclopentadienyl, phenyl, tolyl, naphthyl, and indenyl. With the sulfonium salts, it is possible for the substituent to be further substituted with a dialkyl- or diarylsulfonium cation; an example of this would be 1,4-phenylene bis(diphenylsufonium).

The nature of the counteranion in a cationic photoinitiator can influence the rate and extent of cationic addition polymerization of the epoxy groups. For example, J. V. Crivello, and R. Narayan, Chem. Mater., 4, 692, (1992), report that the order of reactivity among commonly used nonnucleophilic anions is $SbF_6^- > AsF_6^- > PF_6^- > BF_4^-$. The influence of the anion on reactivity has been ascribed to three principle factors: (1) the acidity of the protonic or Lewis acid generated, (2) the degree of ion-pair separation in the propagating cationic chain and (3) the susceptibility of the anions to fluoride abstraction and consequent chain termination. $B(C_6F_5)_4^-$ and phosphate anions of the type $PF_x(R_f)_y^-$, where $R_f$ is a perfluoroalkyl group and x+y=6, may also be used.

Useful onium salts include diazonium salts, such as aryl diazonium salts; halonium salts, such as diarlyiodonium salts; sulfonium salts, such as triarylsulfonium salts; selenonium salts, such as triarylselenonium salts; sulfoxonium salts, such as triarylsulfoxonium salts; and other miscellaneous classes of onium salts such as triaryl phosphonium and arsonium salts, and pyrylium and thiopyrylium salts.

Useful ionic cationic initiators include bis(4-t-butylphenyl) iodonium hexafluoroantimonate (FP5034 from Hampford Research Inc., Stratford, Conn.), a mixture of triarylsulfonium salts (diphenyl(4-phenylthio) phenylsufonium hexafluoroantimonate, bis(4-(diphenylsulfonio)phenyl)sulfide hexafluoroantimonate) available as SYNA PI-6976 from Synasia Metuchen, N.J., (4-methoxyphenyl)phenyl iodonium triflate, bis(4-tert-butylphenyl) iodonium camphorsulfonate, bis(4-tert-butylphenyl) iodonium hexafluoroantimonate, bis(4-tert-butylphenyl) iodonium hexafluorophosphate, bis(4-tert-butylphenyl) iodonium tetraphenylborate, bis(4-tert-butylphenyl) iodonium tosylate, bis(4-tert-butylphenyl) iodonium triflate, ([4-(octyloxy)phenyl]phenyliodonium hexafluorophosphate), ([4-(octyloxy)phenyl]phenyliodonium hexafluoroantimonate), (4-isopropylphenyl)(4-methylphenyl)iodonium tetrakis (pentafluorophenyl) borate (available as RHODORSIL 2074 from Bluestar Silicones, East Brunswick, N.J.), bis(4-methylphenyl) iodonium hexafluorophosphate (available as OMNICAT 440 from IGM Resins Bartlett, Ill.), 4-[(2-hydroxy-1-tetradecycloxy)phenyl]phenyl iodonium hexafluoroantimonate, triphenylsulfonium hexafluoroantimonate (available as CT-548 from Chitec Technology Corp. Taipei, Taiwan), diphenyl(4-phenylthio)phenylsufonium hexafluorophosphate, bis(4-(diphenylsulfonio)phenyl) sulfide bis(hexafluorophosphate), diphenyl(4-phenylthio)phenylsufonium hexafluoroantimonate, bis(4-(diphenylsulfonio)phenyl)sulfide hexafluoroantimonate, and blends of these triarylsulfonium salts available from Synasia, Metuchen, N.J. under the trade designations of SYNA PI-6992 and SYNA PI-6976 for the $PF_6$ and $SbF_6$ salts, respectively, as well as from Chitec Technology Co. Taipei City, Taiwan. under the trade designations of CHITEC 1176 for the $SbF_6$ salt.

The cationic photoinitiator is used in amounts sufficient to effect the desired degree of crosslinking of the reactive composition. The desired degree of crosslinking may vary, depending on the desired adhesive properties and the film thickness. The amount of the cationic photoinitiator necessary to effect the desired degree of crosslinking will depend on the quantum yield of the cationic photoinitiator (the number of molecules acid release per photon absorbed), the pKa of the acid, the permeability of the polymer matrix, the wavelength and duration of irradiation and the temperature. Generally the cationic photoinitiator is used in amounts of 0.01 to 1 parts 15 by weight, more typically 0.1 to 0.5, parts by weight relative to 100 parts by weight of total monomer/oligomer.

As mentioned above, typically one or more photoinitiators are used, but in some embodiments it may be suitable that one or more of the initiators comprise a thermal initiator. While the use of thermal initiators can be problematic due to the desired property of heat conformability prior to curing of the curable films, and the use of the curable films with thermally sensitive substrates, the use of such initiators may be suitable in some embodiments as will be understood by one of skill in the art. In particular, use of one or more thermal initiators in conjunction with one or more photoinitiators can permit the curable film to be a dual cure film. By this it is meant that the curing can be carried out in two distinct stages. For example, the curable film can be exposed to radiation to activate the photoinitiator and cause free radical polymerization to occur. The film could then be exposed to sufficient heat to activate a cationic initiator and cause cationic polymerization to occur. The advantages of such a polymerization mechanism are many, including the ability to inspect articles after the photopolymerization step to determine if any defects are present and to eliminate these defects before the final polymerization. Additionally it permits the two polymerization steps to be carried out at different times and at different locations, and can make for easier assembly.

As mentioned above, the reactive composition may also comprise a reactive adhesion promoter. Typically the reactive adhesion promoter is a relatively low molecular weight compound that contains at least one functional group reactive with the other reactive groups present in the reactive composition. Examples of suitable reactive groups include (meth)acrylate groups (co-reactive with free radically polymerizable groups) and epoxy groups (co-reactive with hydroxyl groups). Typically these low molecular weight compounds have number average molecular weights of less than 1,000 g/mole, or even less than 500 g/mole. Examples of suitable reactive adhesion promoters include the cycloalipahtic difunctional epoxy EPONEX 1510 commercially available from Momentive Specialty Chemicals, Columbus, Ohio Additionally, hydroxyl-functional (meth)acrylate compounds and silane-functional (meth)acrylates can also be used as reactive adhesion promoters.

As mentioned above, the reactive composition may also comprise a crosslinker. Virtually any crosslinking agent that can co-react with the reactive compounds of the reactive composition may be suitable. One class of useful crosslinking agents include multifunctional (meth)acrylate species. Multifunctional (meth)acrylates include tri(meth)acrylates and di(meth)acrylates (that is, compounds comprising three or two (meth)acrylate groups). Typically di(meth)acrylate crosslinkers (that is, compounds comprising two (meth) acrylate groups) are used. Useful tri(meth)acrylates include, for example, trimethylolpropane tri(meth)acrylate, propoxylated trimethylolpropane triacrylates, ethoxylated trimethylolpropane triacrylates, tris(2-hydroxy ethyl)isocyanurate triacrylate, and pentaerythritol triacrylate. Useful di(meth) acrylates include, for example, ethylene glycol di(meth) acrylate, diethylene glycol di(meth)acrylate, triethylene glycol di(meth)acrylate, tetraethylene glycol di(meth)acrylate, 1,4-butanediol di(meth)acrylate, 1,6-hexanediol di(meth) acrylate, alkoxylated 1,6-hexanediol diacrylates, tripropylene glycol diacrylate, dipropylene glycol diacrylate, cyclohexane dimethanol di(meth)acrylate, alkoxylated cyclohexane dimethanol diacrylates, ethoxylated bisphenol A di(meth)acrylates, neopentyl glycol diacrylate, polyethylene glycol di(meth)acrylates, polypropylene glycol di(meth) acrylates, and urethane di(meth)acrylates.

Another useful class of crosslinking agents contain functionality which is reactive with hydroxyl groups present in the reactive composition. Examples of such crosslinkers include multifunctional aziridine, isocyanate, and epoxy compounds. Examples of aziridine-type crosslinkers include, for example 1,4-bis(ethyleneiminocarbonylamino) benzene, 4,4'-bis(ethyleneiminocarbonylamino)diphenylmethane, 1,8-bis(ethyleneiminocarbonylamino)octane, and 1,1'-(1,3-phenylene dicarbonyl)-bis-(2-methylaziridine). The aziridine crosslinker 1,1'-(1,3-phenylene dicarbonyl)-bis-(2-methylaziridine) (CAS No. 7652-64-4), referred to herein as "Bisamide" is particularly useful. Common polyfunctional isocyanate crosslinkers include, for example, trimethylolpropane toluene diisocyanate, tolylene diisocyanate, and hexamethylene diisocyanate.

Examples of epoxy-type crosslinkers are those known to undergo cationic polymerization and include 1,2-, 1,3-, and 1,4-cyclic ethers (also designated as 1,2-, 1,3-, and 1,4-epoxides). See the "Encyclopedia of Polymer Science and Technology", 6, (1986), p. 322, for a description of suitable epoxy resins. In particular, cyclic ethers that are useful include the cycloaliphatic epoxies such as cyclohexene oxide, vinylcyclohexene oxide, vinylcyclohexene dioxide, 3,4-epoxycyclohexylmethyl-3,4-epoxycyclohexane carboxylate such as CELLOXIDE 2021P from Daicel USA Fort Lee, N.J., bis-(3,4-epoxycyclohexyl) adipate such as SYNA 28 from Synasia Metuchen, N.J., 2-(3,4-epoxycylclohexyl-5,5-spiro-3,4-epoxy) cyclohexene-meta-dioxane, and the cycloalipahtic difunctional epoxy EPONEX 1510 commercially available from Momentive Specialty Chemicals, Columbus, Ohio; also included are the glycidyl ether type epoxy resins such as propylene oxide, epichlorohydrin, styrene oxide, glycidol, the EPON series type of epoxy resins available from Shell Chemical Co., Houston, Tex., including the diglycidyl ether of bisphenol A and bisphenol F, and chain extended versions of this material such as EPON 828, Epon 862, EPON 1001, EPON 1004, EPON 1007, EPON 1009 and EPON 2002 or their equivalent from other manufacturers, 1,4-butanediol diglycidyl ether, polyglycidyl ether of phenolformaldehyde, resorcinol diglycidyl ether, epoxidized phenolic novolac resins such as DEN 431 and DEN 438 available from Dow Chemical Co., Midland Mich., and epoxidized cresol novolac resins such as ARALDITE ECN 1299 available from Huntsman Advanced Materials, The Woodlands, Tex. Mixtures of epoxy crosslinkers may also be used.

In addition to the above reactive components, the reactive composition may additionally comprise one or more non-reactive additives. Any suitable additive can be used as long as it does interfere with the curing of the reactive components or adversely affect the properties of the curable film adhesive, such as the conformability properties or the optical properties. Examples of suitable non-reactive additives include nanoparticle fillers, bead fillers, antioxidants, viscosity control additives, refractive index modifying agents, or combinations thereof. Unlike comparable liquid adhesives, the curable films of this disclosure do not require thixotropic agents. The reactive components provide the desired viscosity control through the use of heat without the need for thixotropic agents.

Typically the reactive composition comprises at least 50% by weight of the ethylenically unsaturated polyester-containing oligomeric composition that is the reaction product of a saturated, amorphous co-polyester polyol and a compound with a terminal polyol-reactive group and a terminal ethylenically unsaturated group. The remainder of the reactive composition comprises a (meth)acrylate functional material, initiator, and any other optional reactive or non-reactive additives. In some embodiments the reactive composition comprises at least 70% by weight of the ethylenically unsaturated polyester-containing oligomeric composition that is the reaction product of a saturated, amorphous co-polyester polyol and a compound with a terminal polyol-reactive group and a terminal ethylenically unsaturated group. In some embodiments the reactive composition comprises up to 95% by weight of the ethylenically unsaturated polyester-containing oligomeric composition that is the reaction product of a saturated, amorphous co-polyester polyol and a compound with a terminal polyol-reactive group and a terminal ethylenically unsaturated group.

Also disclosed herein are adhesive articles. These articles comprise a first substrate with a first major surface and a second major surface and a curable film in contact with the second major surface of the first substrate. The curable film is the flexible free-standing optically clear film conformable to three dimensional features on a substrate upon heating to a temperature of 85° C. or less, which has been described above.

A wide variety of substrates are suitable as the first substrate for the adhesive articles of this disclosure. The substrate may be a rigid substrate or a non-rigid substrate. Examples of rigid substrates include glass plates, relatively thick polymeric plates such as polymethyl methacrylate (PMMA) plates and polycarbonate (PC) plates, and the exterior surface of devices. Because the curable films are optically clear and conformable, particularly suitable rigid substrates are those that take advantage of these desirable properties, such as rigid substrates that are a part of devices that require such properties. Examples of such devices are touch panels and a display panels. Bonding a touch panel or display panel (such as an LCD panel) to a three-dimensional (3-D) cover glass by means of an optically clear adhesive can be challenging. Indeed, newer designs use cover glasses having a thick (approaching 50 micrometers) ink step around the perimeter or frame of the cover glass, generating a substrate that is no longer flat but has a third dimension to it (i.e. the optically clear adhesive has to conform to significant differences in the z-dimension of the cover lens substrate). The region encompassed by the ink step is often referred to as a gap. The curable films of this disclosure are compliant enough to conform over the ink area and thus completely fill the gap or completely wet the surface of the corresponding viewing area of the display.

In addition to the large ink step, other 3-D features that are suitable for use with the curable films of this disclosure are ones that may require good adhesive wetting of any of the display components such as the presence of a flex connector, slight curvature of the components, thicker ITO patterns, presence of raised integrated circuits on a touch panel and the like.

Examples of suitable non-rigid substrates include polymeric films. Examples of polymeric films include films comprising one or more polymers such as cellulose acetate butyrate; cellulose acetate propionate; cellulose triacetate; poly(meth)acrylates such as polymethyl methacrylate; polyesters such as polyethylene terephthalate, and polyethylene naphthalate; copolymers or blends based on naphthalene dicarboxylic acids; polyether sulfones; polyurethanes; polycarbonates; polyvinyl chloride; syndiotactic polystyrene; cyclic olefin copolymers; and polyolefins including polyethylene and polypropylene such as cast and biaxially oriented polypropylene. The substrate may comprise single or multiple layers, such as polyethylene-coated polyethylene terephthalate. The substrate may be primed or treated to impart some desired property to one or more of its surfaces. Examples of such treatments include corona, flame, plasma and chemical treatments.

One particularly suitable class of film substrates are optical films. As used herein, the term "optical film" refers to a film that can be used to produce an optical effect. The optical films are typically polymer-containing films that can be a single layer or multiple layers. The optical films can be of any suitable thickness. The optical films often are at least partially transmissive, reflective, antireflective, polarizing, optically clear, or diffusive with respect to some wavelengths of the electromagnetic spectrum (e.g., wavelengths in the visible ultraviolet, or infrared regions of the electromagnetic spectrum). Exemplary optical films include, but are not limited to, visible mirror films, color mirror films, solar reflective films, diffusive films, infrared reflective films, ultraviolet reflective films, reflective polarizer films such as brightness enhancement films and dual brightness enhancement films, absorptive polarizer films, optically clear films, tinted films, dyed films, privacy films such as light-collimating films, and antireflective films, antiglare films, soil resistant films, and anti-fingerprint films.

In some embodiments the optical film has a coating. In general, coatings are used to enhance the function of the film or provide additional functionality to the film. Examples of coatings include, for example, hardcoats, anti-fog coatings, anti-scratch coatings, privacy coatings, anti-fingerprint coatings, antimicrobial coatings or a combination thereof. Coatings such as hardcoats, anti-fog coatings, and anti-scratch coatings that provide enhanced durability, are desirable in applications such as, for example, touch screen sensors, display screens, graphics applications and the like. Examples of privacy coatings include, for example, blurry or hazy coatings to give obscured viewing or louvered films to limit the viewing angle. Examples of anti-fingerprint coatings include those described in U.S. Patent Application Ser. No. 61/486,000 filed May 13, 2011 titled: "COATING COMPOSITIONS COMPRISING NON-IONIC SURFACTANT EXHIBITING REDUCED FINGERPRINT VISIBILITY" which describes coatings prepared from a curable resin and a non-ionic surfactant. Examples of anti-microbial coatings include those described in U.S. Pat. No. 8,124,169 (Ylitalo et al.) which describe an antimicrobial coating system that includes a film-forming composition and an effective amount of an antimicrobial agent dispersed within the film-forming composition.

Some optical films have multiple layers such as multiple layers of polymer-containing materials (e.g., polymers with or without dyes) or multiple layers of metal-containing material and polymeric materials. Some optical films have alternating layers of polymeric material with different refractive indices. Other optical films have alternating polymeric layers and metal-containing layers. Exemplary optical films are described in the following patents: U.S. Pat. No. 6,049,419 (Wheatley et al.); U.S. Pat. No. 5,223,465 (Wheatley et al.); U.S. Pat. No. 5,882,774 (Jonza et al.); U.S. Pat. No. 6,049,419 (Wheatley et al.); U.S. Pat. No. RE 34,605 (Schrenk et al.); U.S. Pat. No. 5,579,162 (Bjornard et al.), and U.S. Pat. No. 5,360,659 (Arends et al.).

Additionally, as with the rigid substrates described above, film substrates also may contain a variety of surface structures. These surface structures may be microstructures or they may be larger.

Also disclosed are articles further comprising a second substrate, where the second substrate comprises a first major surface and a second major surface, where the first major surface of the second substrate is in contact with the curable film. The substrates suitable for use as the first substrate are similarly suitable for use as the second substrate. The second substrate may be the same as the first substrate or it may be different. Additionally, the second substrate may independently be a rigid or non-rigid substrate. The second substrate may be flat or it may contain surface structures.

When two substrates are present, the article is a laminate article of the type first substrate/curable film/second substrate. In some embodiments, the first substrate is a rigid substrate and the second substrate is a non-rigid substrate. In other embodiments, the first substrate is a rigid substrate and the second substrate is also a rigid substrate.

Also described are articles as described above in which the curable film has been cured. These articles include both articles of type first substrate/cured film and laminate articles of the type first substrate/cured film/second substrate.

Also disclosed are methods of preparing and using the curable films described above. The method involves providing a curable film comprising a reactive composition wherein the curable film is a free-standing optically clear film conformable to three dimensional features on a substrate upon heating to a temperature of 85° C. or less. This conformability can be described by the complex viscosity of the film. The films of this disclosure have a complex viscosity of greater than 100,000 poise (10,000 Pascal seconds) at 25° C. and less than 100 poise (10 Pascal seconds) at 85° C., prior to setting (reaction of reactive groups in the reactive composition to form a polymeric composition that is no longer reactive). Complex viscosity is defined as a frequency-dependent viscosity function determined during forced harmonic oscillation of shear stress. Complex viscosity is measured by Dynamic Mechanical Analysis (DMA) using rheometer.

The method further comprises providing a first substrate, where the first substrate has a first major surface and a second major surface, and contacting the curable film to the second major surface of the first substrate, and heating the curable film on the first substrate to a temperature of less than 85° C. to permit conforming of the film to the second major surface of the first substrate, and curing of the curable film.

Examples of suitable first substrates are described above. The first substrate may be a rigid or non-rigid substrate. Particularly suitable first substrates are those comprising three dimensional surface features, as described above.

The cured film has the characteristic that the bond formed between the cured film and a glass substrate has an adhesive strength of greater than 100 Newtons per square centimeter (N/cm$^2$) when measured according to the shear adhesion test method described in the Examples section, which is a modification of the ASTM test method ASTM D1002-10 with glass substrates in place of metal ones. This adhesive strength of the cured film to glass substrates is a performance characteristic of the adhesive film. This property is similar to other performance properties characteristic of the adhesive film, and this characteristic does not mean that the adhesive films of this disclosure only bond to glass, rather glass is used as a standard test substrate, and the shear adhesion to glass is thus a measurable property of the reactive adhesive film once it is set, and is not the description of an article comprising glass substrates and the set reactive adhesive film. In a similar way, when peel adhesion parameters are reported in the art, the articles tested are of an adhesive layer on a backing layer adhered to a substrate (typically stainless steel or glass). The adhesive and backing are peeled away at a give angle (typically 90° or 180°) and the force required is measured. This peel force or peel adhesion is a physical property of the adhesive layer, it is not a description of a property of the substrate/adhesive/backing article. The article is simply used as a method for determining the property of the adhesive.

In some embodiments, the method may further comprise providing a second substrate with a first major surface and a second major surface and contacting the first major surface of the second substrate to the curable film prior to curing. The second substrate may be a rigid or a non-rigid substrate and may be the same as or different from the first substrate.

The curable film comprises a reactive composition. By reactive composition it is meant that the composition is free-radically polymerizable. Additionally, the reactive composition may also contain reactive compounds that react by other mechanisms such as cationic polymerization. The reactive composition provides the desirable conformability and optical features to the curable adhesive film. The reactive composition may comprise only reactive components, or the reactive composition may also comprise optional non-reactive components.

The curable film, while a free-standing film, is heat conformable. This means that the film can be applied and handled as a film but upon heating to relatively low temperature (at most 85° C.) the film softens and conforms to structures on the surface to which it is in contact and then cures to form a layer that has the desirable structural integrity and durability to withstand the use demands described above. In this way the desirable conformability of a liquid adhesive is provided by a convenient film adhesive.

The surfaces to which the curable film is contacted can have a wide range of three dimensional structural features, as have been described above. After the curable film has been permitted to conform to the surface to which it is in contact, the film is cured. Because the film uses heat to conform to the surface, typically thermal initiators are not used. Thermal initiators are not desirable for a number of reasons. Often thermal initiators require relatively high temperatures and/or long heating times to effect curing. Since many of the substrates designed to be used with the curable films of this disclosure are thermally sensitive (such as electronic devices) such temperatures and heating times are undesirable. Additionally, as mentioned above, since heat is used to permit the films to conform to the surface, it is not desirable for heat to initiate curing, as such curing could interfere with the conformability of the film. Typically photoinitiators are used. In this way curing can be initiated when desired by application of light of the suitable wavelength. As mentioned above, at least one free radical photoinitiator is used, but depending upon the components present in the curable film, additional initiators may also be included such as cationic photoinitiators.

Curing of the curable film may be effected in a variety of ways. Typically the initiator or initiators are activated by exposure to light of the appropriate wavelength and intensity. Often UV light is used. The film can thus be cured by exposure to UV light generated by any suitable source such as UV lamps. Often articles are cured by UV light by passing the article to be cured beneath a bank of UV lamps through the use of conveyor belt or other similar conveyance. Typically only photocuring is used to fully cure the curable film, but in some embodiments it may be desirable to use optional thermal curing as well. If optional thermal curing is to be used, the heat can be supplied in a variety of ways through the use of an IR lamp, by placing the article in an oven, or by using an autoclave.

Typically, the reactive composition comprises at least two reactive components: an ethylenically unsaturated polyester-containing oligomeric composition; and a (meth)acrylate functional material, and at least one initiator. In some embodiments, the reactive composition may also comprise other reactive components such as reactive adhesion promoters and/or crosslinkers. Additionally, the reactive composition may also contain non-reactive additives. Each of these components has been described in greater detail above.

The reactive composition can be formed into a flexible free-standing film in a variety of ways. Typically, the components of the reactive composition are mixed together to form a reactive composition mixture, and coated onto a carrier layer to form the flexible free-standing film. The reactive composition components can be mixed by traditional methods known to those skilled in the art. Such methods include mixing, mechanical rolling, hot melt blending, etc. In some embodiments, the components are mixed in solution. Examples of suitable solvents are described above, and include ethyl acetate, acetone, methyl ethyl ketone, heptane, toluene and mixtures thereof. In other embodiments the components are mixed as a 100% solids composition, such as by hot melt mixing. A variety of hot melt mixing techniques using a variety of hot melt mixing equipment are suitable for processing the adhesive compositions which contain elastomeric polymers in polymeric shells. Both batch and continuous mixing equipment may be used. Examples of batch methods include those using a BRABENDER (e.g. a BRABENDER PREP CENTER, commercially available from C.W. Brabender Instruments, Inc.; South Hackensack, N.J.) or BANBURY internal mixing and roll milling equipment (e.g. equipment available from Farrel Co.; Ansonia, Conn.). Examples of continuous methods include single screw extruding, twin screw extruding, disk extruding, reciprocating single screw extruding, and pin barrel single screw extruding. Continuous methods can utilize distributive elements, pin mixing elements, static mixing elements, and dispersive elements such as MADDOCK mixing elements and SAXTON mixing elements.

The reactive composition mixture can be coated on the carrier layer in a variety of different ways depending upon the nature of the reactive composition mixture. If the reactive composition mixture contains solvent, the reactive composition mixture can be coated by such methods as knife coating, roll coating, gravure coating, rod coating, curtain coating, and air knife coating. The reactive composition mixture may also be printed by known methods such as screen printing or inkjet printing. The coated reactive composition mixture is then generally dried to remove the solvent. Typically, the coating is subjected to elevated temperatures, such as those supplied by an oven, to expedite drying of the adhesive.

If the reactive composition mixture is a 100% solids mixture, the flexible free-standing film can be formed by continuous forming methods. Continuous forming methods include drawing the reactive composition mixture out of a film die and subsequently contacting the drawn film to a moving carrier layer. After forming, the curable film can be solidified by quenching using both direct methods (e.g., chill rolls or water baths) and indirect methods (e.g., air or gas impingement).

A wide variety of carrier layers are suitable. Typically the carrier layer is a release liner or other film from which the curable film can be readily removed. Exemplary release liners include those prepared from paper (e.g., Kraft paper) or polymeric material (e.g., polyolefins such as polyethylene or polypropylene, ethylene vinyl acetate, polyurethanes, polyesters such as polyethylene terephthalate, and the like, and combinations thereof). At least some release liners are coated with a layer of a release agent such as a silicone-containing material or a fluorocarbon-containing material. Exemplary release liners include, but are not limited to, liners commercially available from CP Film (Martinsville, Va.) under the trade designation "T-30" and "T-10" that have a silicone release coating on polyethylene terephthalate film. The curable film, once formed, is a free-standing film not requiring a carrier layer, but it is often convenient to handle the film on a carrier layer. This disclosure includes the following embodiments:

Among the embodiments are curable films. A first embodiment includes a curable film comprising a reactive composition, wherein the curable film is a free-standing, optically clear, conformable film having a complex viscosity of greater than 100,000 poise (10,000 Pascal seconds) at 25° C. and less than 100 poise (10 Pascal seconds) at 85° C., prior to setting; and wherein the set film has an adhesive shear strength of greater than 100 Newtons per square centimeter ($N/cm^2$) to a glass substrate when measured according to the Shear Adhesion Test Method.

Embodiment 2 is the curable film of embodiment 1 wherein the reactive composition comprises: an ethylenically unsaturated polyester-containing oligomeric composition that is the reaction product of a saturated, amorphous co-polyester polyol and a compound with a terminal polyol-reactive group and a terminal ethylenically unsaturated group; a (meth)acrylate functional material; and at least one initiator.

Embodiment 3 is the curable film of embodiment 2, wherein the saturated, amorphous co-polyester polyol has a number average molecular weight in the range of 1,500-5,000 g/mol.

Embodiment 4 is the curable film of embodiment 2 or 3, wherein the reaction product of a saturated, amorphous co-polyester polyol and a compound with a terminal polyol-reactive group and a terminal ethylenically unsaturated group, comprises the reaction product of a reaction mixture, wherein the ratio of hydroxyl groups on the saturated, amorphous co-polyester polyol to the number of terminal polyol-reactive groups is less than 1:1.

Embodiment 5 is the curable film of any of embodiments 2-4, wherein the (meth)acrylate functional material comprises an oligomer with polyester linkages and/or urethane linkages.

Embodiment 6 is the curable film of any of embodiments 2-5, further comprising at least one reactive or non-reactive additive or combination thereof.

Embodiment 7 is the curable film of embodiment 7, wherein the reactive additive comprises an adhesion promoting compound comprises, a crosslinker, or a combination thereof.

Embodiment 8 is the curable film of embodiment 7, wherein the adhesion promoting additive comprises an epoxy-functional material, a (meth)acrylate-functional material, or a combination thereof.

Embodiment 9 is the curable film of embodiment 6, wherein the non-reactive additive comprises a nanoparticle filler, a bead filler, an antioxidant, a viscosity control additive, a refractive index modifying agent, or a combination thereof.

Also among the embodiments are articles. Embodiment 10 includes an article comprising: a first substrate with a first major surface and a second major surface; and a curable film contacting the second major surface of the first substrate, the curable film comprising: a free-standing, optically clear, conformable film having a complex viscosity of greater than 100,000 poise (10,000 Pascal seconds) at 25° C. and less than 100 poise (10 Pascal seconds) at 85° C., prior to setting; and wherein the set film has an adhesive shear strength of greater than 100 Newtons per square centimeter (N/cm$^2$) to a glass substrate when measured according to the Shear Adhesion Test Method.

Embodiment 11 is the article of embodiment 10, wherein the reactive composition comprises: an ethylenically unsaturated polyester-containing oligomeric composition that is the reaction product of a saturated, amorphous co-polyester polyol and a compound with a terminal polyol-reactive group and a terminal ethylenically unsaturated group; a (meth)acrylate functional material; and at least one initiator.

Embodiment 12 is the article of embodiment 11, wherein the saturated, amorphous co-polyester polyol has a number average molecular weight in the range of 1,500-5,000 g/mol.

Embodiment 13 is the article of embodiment 11 or 12, wherein the reaction product of a saturated, amorphous co-polyester polyol and a compound with a terminal polyol-reactive group and a terminal ethylenically unsaturated group, comprises the reaction product of a reaction mixture, wherein the ratio of hydroxyl groups on the saturated, amorphous co-polyester polyol to the number of terminal polyol-reactive groups is less than 1:1.

Embodiment 14 is the article of any of embodiments 11-13, wherein the (meth)acrylate functional material comprises an oligomer with polyester linkages and/or urethane linkages.

Embodiment 15 is the article of any of embodiments 11-14, further comprising at least one reactive or non-reactive additive or combination thereof.

Embodiment 16 is the article of embodiment 15, wherein the reactive additive comprises an adhesion promoting compound comprises, a crosslinker, or a combination thereof.

Embodiment 17 is the article of embodiment 16, wherein the adhesion promoting additive comprises an epoxy-functional material, a (meth)acrylate-functional material, or a combination thereof.

Embodiment 18 is the article of embodiment 15, wherein the non-reactive additive comprises a nanoparticle filler, a bead filler, an antioxidant, a viscosity control additive, a refractive index modifying agent, or a combination thereof.

Embodiment 19 is the article of any of embodiments 10-18, wherein the first substrate comprises a rigid substrate.

Embodiment 20 is the article of any of embodiments 10-18, wherein the first substrate comprises a non-rigid substrate.

Embodiment 21 is the article of any of embodiments 10-20, wherein the curable film has been cured.

Embodiment 22 is the article of any of embodiments 10-20, further comprising a second substrate with a first major surface and a second major surface, wherein the first major surface of the second substrate is in contact with the curable film such that the second substrate is in contact with a surface of the curable film that is opposite to the surface of the curable film in contact with the first substrate.

Embodiment 23 is the article of embodiment 22, wherein the curable film has been cured.

Also among the embodiments are methods of using a curable film. Embodiment 24 includes a method of using a curable film comprising: providing a curable film, the curable film comprising: a reactive composition comprising a free-standing, optically clear, conformable film having a complex viscosity of greater than 100,000 poise (10,000 Pascal seconds) at 25° C. and less than 100 poise (10 Pascal seconds) at 85° C., prior to setting; and wherein the set film has an adhesive shear strength of greater than 100 Newtons per square centimeter (N/cm$^2$) to a glass substrate when measured according to the Shear Adhesion Test Method; providing a first substrate with a first major surface and a second major surface; contacting the curable film to the second major surface of the first substrate; heating the curable film on the second major surface of the first substrate to a temperature of less than 85° C. to permit conforming of the film to the first substrate; and curing the curable film.

Embodiment 25 is the method of embodiment 24, wherein the reactive composition comprises: an ethylenically unsaturated polyester-containing oligomeric composition that is the reaction product of a saturated, amorphous co-polyester polyol and a compound with a terminal polyol-reactive group and a terminal ethylenically unsaturated group; a (meth)acrylate functional material; and at least one initiator.

Embodiment 26 is the method of embodiment 25, wherein the saturated, amorphous co-polyester polyol has a number average molecular weight in the range of 1,500-5,000 g/mol.

Embodiment 27 is the method of embodiment 25 or 26, wherein the reaction product of a saturated, amorphous co-polyester polyol and a compound with a terminal polyol-reactive group and a terminal ethylenically unsaturated group, comprises the reaction product of a reaction mixture, wherein the ratio of hydroxyl groups on the saturated, amorphous co-polyester polyol to the number of terminal polyol-reactive groups is less than 1:1.

Embodiment 28 is the method of any of embodiments 25-27, wherein the (meth)acrylate functional material comprises an oligomer with polyester linkages and/or urethane linkages.

Embodiment 29 is the method of any of embodiments 25-28, further comprising at least one reactive or non-reactive additive or combination thereof.

Embodiment 30 is the method of embodiment 29, wherein the reactive additive comprises an adhesion promoting compound, a crosslinker, or a combination thereof.

Embodiment 31 is the method of embodiment 30, wherein the adhesion promoting additive comprises an epoxy-functional material, a (meth)acrylate-functional material, or a combination thereof.

Embodiment 32 is the method of embodiment 29, wherein the non-reactive additive comprises a nanoparticle filler, a bead filler, an antioxidant, a viscosity control additive, a refractive index modifying agent, or a combination thereof.

Embodiment 33 is the method of any of embodiments 24-32, wherein the first substrate comprises a rigid substrate.

Embodiment 34 is the method of any of embodiments 24-32, wherein the first substrate comprises a non-rigid substrate.

Embodiment 35 is the method of any of embodiments 24-34, further comprising a second substrate with a first major surface and a second major surface, wherein the first major surface of the second substrate is in contact with the curable film such that the second substrate is in contact with a surface of the curable film that is opposite to the surface of the curable film in contact with the first substrate.

Embodiment 36 is the method of any of embodiments 24-35, wherein curing comprises photocuring.

Embodiment 37 is the method of embodiment 36 wherein curing further comprises thermal curing.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted. The following abbreviations are used: cm=centimeters; $cm^2$=square centimeters; mm=millimeters; in =inch; J=Joules; Pa=Pascals; min=minutes; h=hours; CTH=Controlled Temperature and Humidity; eq=equivalents; L=liters; Hz=Hertz; FTIR=Fourier transform infrared spectroscopy; pph=parts per hundred. The terms "weight %", "% by weight", and "wt %" are used interchangeably, and refers to the total weight of solids.

Table of Abbreviations

| Abbreviation or Trade Designation | Description |
|---|---|
| Iso-1 | Isophorone diisocyanate commercially available as "DESMODUR I" from Bayer, Pittsburgh, PA. |
| PE Diol-1 | Polyester diol commercially available as "DYNACOLL 7111" from Evonik, Parsippany, NJ. |
| PE Diol-2 | Polyester diol commercially available as "DYNACOLL 7110" from Evonik, Parsippany, NJ. |
| PE Diol-3 | Polycaprolactone diol commercially available as "CAPA 2100" from Perstorp, Toledo, OH. |
| IEM | Isocyanatoethyl methacrylate commercially available from CBC America, Commack, NY. |
| 2-HEA | 2-hydroxyethyl acrylate |
| Epoxy-1 | cycloalphatic difunctional epoxy commercially available as "EPONEX 1510" from Momentive Specialty Chemicals, Columbus, OH. |
| HPA | Hydroxypropyl acrylate |
| EVA-1 | Ethylene vinyl acetate copolymer commercially available as "ELVAX 410" from DuPont, Wilmington, DE. |
| LOCA | A 3M developmental liquid optically clear adhesive EAS-2185, prepared as described in Synthesis Example SE-3 below. |
| RPE | Reactive PolyEster macromer |
| RPE-1 | Reactive polyester macromer formed from the reaction of PE Diol-1 with 0.5 equivalents of IEM as described in the general method of Synthesis Example SE-2. |
| RPE-2 | Reactive polyester macromer formed from the reaction of PE Diol-1 with 1.0 equivalents of IEM as described in the general method of Synthesis Example SE-2. |
| RPE-3 | Reactive polyester macromer formed from the reaction of PE Diol-2 with 0.5 equivalents of IEM as described in the general method of Synthesis Example SE-2. |
| RPE-4 | Reactive polyester macromer formed from the reaction of PE Diol-2 with 1.0 equivalents of IEM as described in the general method of Synthesis Example SE-2. |
| RPE-5 | Reactive polyester macromer formed from the reaction of a reaction mixture with a ratio of reactants by equivalents of 16/14/2 of Iso-1/PE Diol-3/2-HEA as described in the general method of Synthesis Example SE-1. |
| RPE-6 | Reactive polyester macromer formed from the reaction of a reaction mixture with a ratio of reactants by equivalents of 16/14/1 of PE Diol-3/Iso-1/IEM as described in the general method of Synthesis Example SE-1. |
| Filament Tape | 3M SCOTCH 893 filament tape commercially available from 3M Company, St. Paul, MN |
| Liner-1 | Release liner of 2 mil (51 micrometer) thickness prepared with acrylic release agent as described in U.S. Pat. No. 7,816,477 (Suwa). |
| MEK | Methyl ethyl ketone |
| DBTDL | Dibutyl tin dilaurate |
| PI | Photoinitiator, free radical photoinitiator commercially available as "DAROCURE 4265" from BASF, Charlotte, NC. |
| CI | Cationic initiator, sulfonium cationic photoinitiator commercially available as "CHIVACURE 1176" from Chitech Technology Co., Taipei City, Taiwan. |

Test Methods
Dynamic Mechanical Testing (DMA)

Dynamic mechanical testing of samples was carried out both before setting (photopolymerization) and after setting.

Pre-Photopolymerization

The sample blends were cast into TEFLON trays to remove any residual solvent. Samples were then slightly heated until the material became soft to aid in their removal from the TEFLON tray. The viscosity of the material was measured using a Discovery rheometer (Texas Instruments, INC., New Castle, Del.) prior to setting the adhesive film. The viscosity was measured at a temperature sweep from 25° C. to 85° C., with dynamic temperature step of 5° C./min using 25 mm plates, at a strain of 4-5% and a frequency of 1 Hertz.

Post-Photopolymerization

The mixed blends were coated onto Liner-1 to a thickness of 6 mils (152 micrometers) and cured at an intensity of 3-3.1 J/cm$^2$. The adhesive was laminated into stacks to achieve a sample thickness greater than 20 mils (508 micrometers). The viscosity was measured as a temperature sweep from 25° C. to 65° C., with dynamic temperature step of 5° C./min using 25 mm plates, at a strain of 4% and a frequency of 1 Hertz.

Luminous Transmission, Clarity, and Haze (ASTM D1003-00)

Luminous transmission, clarity and haze were measured according to ASTM D1003-00 using a Gardner Haze-Guard Plus model 4725 (available from BYK-Gardner Columbia, Md.). The adhesive was applied in 2-2.5 cm diameter circles between two stripes of 3M SCOTCH 893 filament tape on LCD glass. The filament tape was used to achieve a uniform thickness of 6 mils (152 micrometers). Once between two glass pieces, the adhesive was cured at an intensity of 3-3.1 J/cm$^2$. The percent transmission, the percent haze, and the percent clarity values were recorded and reported as an average value.

Shear Adhesion

The shear adhesion test is a modification of ASTM D1002-10 substituting glass substrates for metal substrates. Shear adhesion was measured 24 hours after the application of the adhesive to the air-side of 2 in ×4 in × ⅛ in (5 cm×10 cm×0.32 cm) soda-lime float glass plate. The adhesive was applied in 1.5-2.5 cm diameter circles in between two stripes of 3M SCOTCH 893 filament tape. The filament tape was used to achieve a uniform thickness of 6 mils (152 micrometers). The adhesive was pressed between two pieces of glass to achieve the appropriate diameter. Isopropyl alcohol was used to clean the glass prior to adhesive application. Samples were cured at an intensity of 3-3.1 J/cm$^2$. The samples were then equilibrated at CTH of 23° C. and relative humidity of 50%, for twenty four hours prior to testing. The shear adhesion was measured at a crosshead speed of 25 mm/min using MTS (MTS Systems Corp, Eden Prairie, Minn.). The shear adhesion is an average of three to four replicates and expressed in Newtons per cm$^2$. The mode of failure, if failure occurred is also noted, "adhesive" failure meaning that the adhesive-glass bond failed, "cohesive" failure meaning that the adhesive sample failed cohesively.

Pluck Adhesion

Pluck adhesion is a cleavage-type of test. The pluck adhesion was measured 24 hours after the application of the adhesive to the air-side of 2¼ in ×1³⁄₁₆ in × ³⁄₁₆ in (5.7 cm×3.0 cm×0.50 cm) float glass plate. The adhesive was applied in 1.5-3 cm circles in between two stripes of 3M SCOTCH 893 filament tape. The filament tape was used to achieve a uniform thickness of 6 mils (152 micrometers). Isopropyl alcohol was used to clean the glass prior to adhesive application. Samples were cured at an intensity of 3-3.1 J/cm$^2$. The samples were then equilibrated at CTH of 23° C. and relative humidity of 50%, for twenty four hours prior to testing. The pluck adhesion was measured at a crosshead speed of 25 mm/min using MTS (MTS Systems Corp, Eden Prairie, Minn.). The pluck adhesion is an average of three to four replicates and expressed in Newtons per cm$^2$. The mode of failure, if failure occurred is also noted, "adhesive" failure meaning that the adhesive-glass bond failed, "cohesive" failure meaning that the adhesive sample failed cohesively.

SYNTHESIS EXAMPLES

The following two synthesis examples are provided as general synthetic methods for preparing the polyester-containing macromers used in preparing the adhesive samples.

Synthesis Example SE-1: Preparation of RPE-5

This synthesis example utilizes 16 eq of Iso-1, 14 eq PE Diol-3, and 2 eq of 2-HEA. The same procedure can be used with the given ratio of reactants to from RPE-6.

A 2 L 3-necked roundbottom flask equipped with overhead stirrer was charged with 100 g (0.8997 eq) Iso-1 and 100 g MEK, and heated in a 70° C. oil bath for about 10 min. Then 0.25 g of DBTDL was added to the reaction along with a 2-3 g of MEK. The reaction was placed under an air atmosphere and the reaction was fitted with a condenser. A solution of 393.61 g (0.78722 eq) PE Diol-3 in 100 g of MEK made in a bottle and was added to the reaction over 3 h via a pressure equalizing funnel. The bottle was rinsed with 3-20 g aliquots of MEK which were added to the reaction via the pressure equalizing funnel. At 3 h and at 6 h total reaction time, the reaction was monitored by FTIR for the presence of the —NCO peak at 2265 cm$^{-1}$. At 6 h 15 min the spectrum peak intensity was not much changed from the 3 h spectrum, and 13.71 of 2-HEA (0.1184 eq) was added in one portion to the reaction along with 80 g of MEK. At 23 h, FTIR analysis showed no detectable —NCO peak at 2265 cm$^{-1}$, and the reaction was adjusted to 50% solids with the addition of 167 g of MEK.

Synthesis Example SE-2: Preparation of RPE-1

This synthesis example utilizes 1 eq PE Diol-1, and 0.5 eq of IEM. The same procedure can be used with the given ratio of reactants to from RPE-2, RPE-3, and RPE-4.

A 2 L 3-necked roundbottom flask equipped with overhead stirrer was charged with 907.36 g (0.4868 eq, 1863.8 hydroxy equivalent weight) of PE Diol-1, which had been preheated in a 120° C. oven. The reaction was charged with 300 g MEK, and placed in an oil bath at 80° C. When the material was dissolved, 0.47 g DBTDL and 2-3 g of MEK was added to the reaction and the reaction was placed under an air atmosphere and the reaction was fitted with a condenser. Next, 37.77 g (0.2434 eq) IEM was added in one portion to the reaction along with 105 g of MEK. The reaction was monitored by FTIR for the presence of the —NCO peak at 2265 cm$^{-1}$ at hourly increments. After 9 h at 80° C., the reaction was allowed to cool to room temperature overnight (9 h) with stirring. At this time (total elapsed time of reaction of about 18 h) the —NCO peak was absent and the reaction was adjusted to 70% solids by the addition of MEK.

Synthesis Example SE-3: EAS-2185 Preparation

In the first step of the polymerization, a stainless steel reaction vessel was charged with 33 parts per hundred (pph) of 2-ethylhexyl acrylate (2-EHA), 17 pph of 2-hydroxypropyl methacrylate (2-HPMA), 43 pph of 2-ethylhexyl methacrylate (2-EHMA), 7 pph of 2-hydroxypropyl acrylate (2-HPA), and 4.4 pph of ethylene glycol bisthioglycolate (EGBTG). The reactor was sealed and purged of oxygen and then held at approximately 5 psig (34.5 kPa) nitrogen pressure. The reaction mixture was heated to an induction temperature of 60° C. and the polymerization reaction proceeded adiabatically, peaking at approximately 119° C. When the reaction was complete, the mixture was cooled to 60° C.

In the second step of polymerization, 1.47 pph EGBTG, and three free radical initiators were added: 0.02 pph "VAZO 52" from DuPont, Wilmington, Del.; 0.04 pph "VAZO 67" from DuPont, Wilmington, Del.; and 0.05 pph "VAZO 88" from DuPont, Wilmington, Del.; was added to the reaction mixture. The reactor was sealed and purged of oxygen and held at 5 psig (34.5 kPa) nitrogen pressure. The reaction mixture was heated to 60° C. and the reaction proceeded adiabatically, peaking at approximately 115° C. The reaction mixture was then held at 115° C. for 3 hours.

Next, the mixture was cooled to 70° C. and 3.44 pph of IEM was added. A slow stream of a mixture of 90/10 nitrogen/oxygen by volume was bubbled through the mixture as it was held at 70° C. for 8 hours.

Next, the mixture was cooled to 60° C. and 3-(Trimethoxysilyl)propyl methacrylate (commercially available as SILANE A-174 from Momentive) at 0.136 pph, butylated hydroxytoluene at 0.05 pph, Di(tridecyl) 3,3'-thiodipropionate (commercially available as AO503 from Evans Chemetics Co.) at 1.196 pph, ethyl(2,4,6-trimethylbenzoyl)phenylphosphinate (commercially available as IRGACURE TPO-L from BASF) at 0.379 pph, and 8.907 pph of 2-hydroxy propyl methacrylate (2-HPMA) were added prior to draining the product.

Examples E1-E11 and Comparative Examples C1-C3

For Examples E1-E10 and Comparative Examples C1-C4, the sample composition was prepared by mixing the components described in Table 1 below. Comparative C-1, while a free-standing film, was quite brittle and was not flexible. Comparative Example C-2 was not a reactive composition but a pre-reacted polymer that were cast and tested in the same way as the reactive compositions. Comparative Example C-3 was a reactive liquid composition, and was not truly a free-standing film and unlike the free-standing films the liquid adhesive was dispensed from a syringe onto a substrate. Comparative Example C-4 demonstrates that not all polyester-based materials have the proper complex viscosity properties. Free-standing films of the samples were prepared by casting into TEFLON trays the component mixtures to remove any residual solvent. The formed free-standing films were removed from the TEFLON trays and tested using the test methods described above. The data for the tests are presented in Tables 2-5 below.

TABLE 1

Sample Compositions

| Example | RPE Identity | RPE Amount (wt %) | Epoxy-1 (wt %) | HPA (wt %) | EVA-1 (wt %) | EAS-2185 (wt %) | PI (wt %) | CI (wt %) |
| --- | --- | --- | --- | --- | --- | --- | --- | --- |
| C-1 | PE Diol-1 | 90 | 10 | — | — | — | — | 0.5 |
| E-1 | RPE-2 | 95 | — | 5 | — | — | 1.0 | — |
| E-2 | RPE-4 RPE-6 | 90 10 | — | — | — | — | 1.0 | — |
| E-3 | RPE-4 RPE-6 | 85 10 | — | 5 | — | — | 1.0 | — |
| E-4 | RPE-3 RPE-5 | 80 10 | 10 | — | — | — | 0.8 | 0.5 |
| E-5 | RPE-1 RPE-5 | 75 5 | 20 | — | — | — | 0.8 | 0.5 |
| E-6 | RPE-1 RPE-5 | 80 10 | 10 | — | — | — | 0.8 | 0.5 |
| E-7 | RPE-1 RPE-5 | 82.5 5 | 12.5 | — | — | — | 0.8 | 0.5 |
| E-8 | RPE-1 RPE-5 | 85 5 | 10 | — | — | — | 0.8 | 0.5 |
| E-9 | RPE-1 RPE-5 | 85 10 | 5 | — | — | — | 0.8 | 0.5 |
| E-10 | RPE-2 RPE-5 | 80 10 | 10 | — | — | — | 0.8 | 0.5 |
| C-2 | — | — | — | — | 100 | — | — | — |
| C-3 | — | — | — | — | — | 100 | — | — |
| C-4 | RPE-5 | 95 | — | 5 | — | — | 1.0 | — |

TABLE 2

Pre-Photopolymerization Dynamic Mechanical Properties

| Example | Viscosity at 1 Hz 25° C. (poise) | Viscosity at 1 Hz 85° C. (poise) |
| --- | --- | --- |
| C1 | 2476160 | 78 |
| E1 | 222780 | 199.3 |
| C4 | 161304 | 2547.5 |
| E4 | 117755 | 876 |
| E6 | 508635 | 345 |
| E7 | 247876 | 235.4 |
| E10 | 154277 | 195.4 |
| E5 | 150000 (30° C.) | 461.2 (80° C.) |

TABLE 2-continued

Pre-Photopolymerization Dynamic Mechanical Properties

| Example | Viscosity at 1 Hz 25° C. (poise) | Viscosity at 1 Hz 85° C. (poise) |
| --- | --- | --- |
| E8 | 85500 (30° C.) | 482.6 (80° C.) |
| E9 | 180900 (30° C.) | 646.4 (80° C.) |
| E2 | 43363.7 | 86.4 |
| E3 | 26796 | 62.2 |
| C2 | 3264620 | 16127 |
| C3 | 515 | 9.28 |

TABLE 3

Post-Photopolymerization Dynamic Mechanical Properties

| Example | Viscosity at 1 Hz 25° C. (poise) |
| --- | --- |
| C1 | 2476160 |
| E2 | 15787800 |
| E3 | 11745800 |
| E4 | 735964 |
| E6 | 7069800 |
| E7 | 27396100 |
| C2 | 3264620 |

TABLE 4

Adhesion Properties

| Example | Shear Adhesion (N/cm²) | Failure | Pluck Adhesion (N/cm²) | Failure |
| --- | --- | --- | --- | --- |
| C1 | 459.6 | no failure | 190.4 | cohesive |
| E2 | 388.8 | adhesive | 288.8 | adhesive |
| E3 | 562.5 | adhesive | 265.7 | cohesive |
| E5 | 135.7 | adhesive | 192.7 | adhesive |
| E6 | 254 | adhesive | 200 | cohesive |
| E7 | 472.12 | adhesive | 494.5 | adhesive |
| E8 | 374 | Adhesive | 317.3 | adhesive |
| E9 | 206.1 | adhesive | 270.9 | adhesive |
| E10 | 295 | adhesive | 190 | adhesive |
| C2 | 36.17 | adhesive | 21.7 | adhesive |
| C3 | 119.2 | cohesive | 251.2 | cohesive |

TABLE 5

Optical Properties

| Example | % Transmission | % Haze | % Clarity |
| --- | --- | --- | --- |
| C1 | 92.73 | 0.48 | 98.867 |
| E3 | 93.7 | 0.25 | 99.97 |
| E6 | 93.3 | 0.65 | 99.6 |
| E7 | 93.5 | 0.65 | 99.5 |
| E10 | 93.2 | 0.79 | 100 |
| C3 | 93.7 | 0.26 | 99.6 |

What is claimed is:

1. A curable film comprising a reactive composition, wherein the curable film is a flexible, free-standing, optically clear, conformable film having a complex viscosity of greater than 100,000 poise (10,000 Pascal seconds) at 25° C., prior to setting; and wherein the set film forms a permanent adhesive bond having an adhesive shear strength of greater than 100 Newtons per square centimeter (N/cm²) to a glass substrate when measured according to the Shear Adhesion Test Method; and wherein the reactive composition comprises:
an ethylenically unsaturated polyester-containing oligomeric composition that is the reaction product of a saturated, amorphous co-polyester polyol and a compound with a terminal polyol-reactive group and a terminal ethylenically unsaturated group;
a (meth)acrylate functional material; and
at least one initiator.

2. The curable film of claim 1, wherein the saturated, amorphous co-polyester polyol has a number average molecular weight in the range of 1,500-5,000 g/mol.

3. The curable film of claim 1, wherein the reaction product of a saturated, amorphous co-polyester polyol and a compound with a terminal polyol-reactive group and a terminal ethylenically unsaturated group, comprises the reaction product of a reaction mixture, wherein the ratio of hydroxyl groups on the saturated, amorphous co-polyester polyol to the number of terminal polyol-reactive groups is less than 1:1.

4. The curable film of claim 1, wherein the (meth)acrylate functional material comprises an oligomeric material with polyester linkages and/or urethane linkages.

5. The curable film of claim 1, further comprising at least one reactive or non-reactive additive or combination thereof.

6. The curable film of claim 5, wherein the reactive additive comprises an adhesion promoting compound comprises, a crosslinker, or a combination thereof.

7. The curable film of claim 6, wherein the adhesion promoting additive comprises an epoxy-functional material, a (meth)acrylate-functional material, or a combination thereof.

8. The curable film of claim 5, wherein the non-reactive additive comprises a nanoparticle filler, a bead filler, an antioxidant, a viscosity control additive, a refractive index modifying agent, or a combination thereof.

9. An article comprising:
a first substrate with a first major surface and a second major surface; and
a curable film contacting the second major surface of the first substrate, the curable film comprising:
a flexible, free-standing, optically clear, conformable film having a complex viscosity of greater than 100,000 poise (10,000 Pascal seconds) at 25° C., prior to setting; and
wherein the set film has an adhesive shear strength of greater than 100 Newtons per square centimeter (N/cm²) to a glass substrate when measured according to the Shear Adhesion Test Method; and wherein the curable film comprises:
an ethylenically unsaturated polyester-containing oligomeric composition that is the reaction product of a saturated, amorphous co-polyester polyol and a compound with a terminal polyol-reactive group and a terminal ethylenically unsaturated group;
a (meth)acrylate functional material; and
at least one initiator.

10. The article of claim 9, wherein the first substrate comprises a rigid substrate.

11. The article of claim 9, wherein the first substrate comprises a non-rigid substrate.

12. The article of claim 9, wherein the curable film has been cured.

13. The article of claim 9, further comprising a second substrate with a first major surface and a second major surface, wherein the first major surface of the second substrate is in contact with the curable film such that the second substrate is in contact with a surface of the curable film that is opposite to the surface of the curable film in contact with the first substrate.

14. The article of claim 13, wherein the curable film has been cured.

15. A method of using a curable film comprising:
  providing a curable film, the curable film comprising:
    a reactive composition comprising a flexible, free-standing, optically clear, conformable film having a complex viscosity of greater than 100,000 poise (10,000 Pascal seconds) at 25° C., prior to setting; and wherein the set film has an adhesive shear strength of greater than 100 Newtons per square centimeter (N/cm$^2$) to a glass substrate when measured according to the Shear Adhesion Test Method; and wherein the reactive composition comprises:
      an ethylenically unsaturated polyester-containing oligomeric composition that is the reaction product of a saturated, amorphous co-polyester polyol and a compound with a terminal polyol-reactive group and a terminal ethylenically unsaturated group;
      a (meth)acrylate functional material; and
      at least one initiator
  providing a first substrate with a first major surface and a second major surface;
  contacting the curable film to the second major surface of the first substrate;
  heating the curable film on the second major surface of the first substrate to a temperature of less than 85° C. to permit conforming of the film to the first substrate; and
  curing the curable film.

16. The method of claim 15, wherein the saturated, amorphous co-polyester polyol has a number average molecular weight in the range of 1,500-5,000 g/mol.

17. The method of claim 15, wherein the reaction product of a saturated, amorphous co-polyester polyol and a compound with a terminal polyol-reactive group and a terminal ethylenically unsaturated group, comprises the reaction product of a reaction mixture, wherein the ratio of hydroxyl groups on the saturated, amorphous co-polyester polyol to the number of terminal polyol-reactive groups is less than 1:1.

18. The method of claim 15, wherein curing comprises photocuring.

* * * * *

UNITED STATES PATENT AND TRADEMARK OFFICE
CERTIFICATE OF CORRECTION

PATENT NO. : 10,982,122 B2
APPLICATION NO. : 15/507556
DATED : April 20, 2021
INVENTOR(S) : Margot Ashley Branigan Kissell Page 1 of 1

It is certified that error appears in the above-identified patent and that said Letters Patent is hereby corrected as shown below:

In the Claims

Column 30
Line 30, delete "compound comprises, a crosslinker" and insert -- compound, a crosslinker --, therefor.

Signed and Sealed this
Seventh Day of November, 2023

Katherine Kelly Vidal
*Director of the United States Patent and Trademark Office*